July 16, 1968  J. TURNER  3,392,612
UNIVERSAL DRIVING AND CLAMPING MEANS
Filed Feb. 7, 1966  3 Sheets-Sheet 1
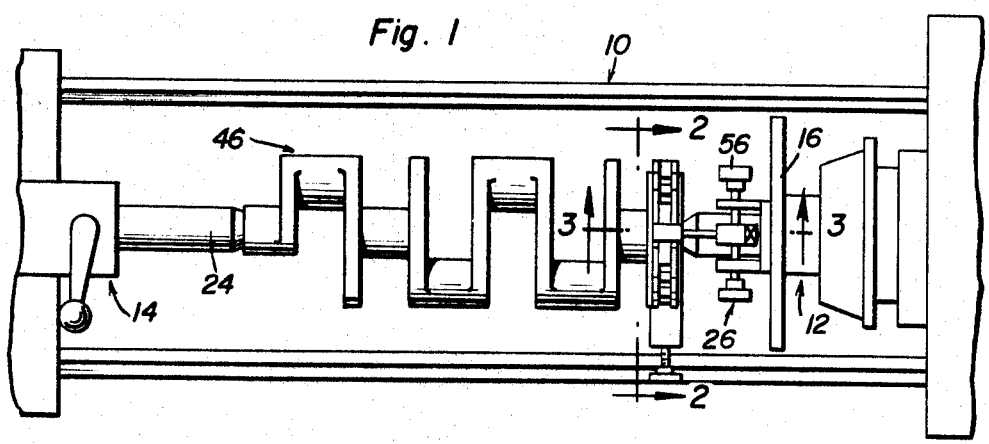
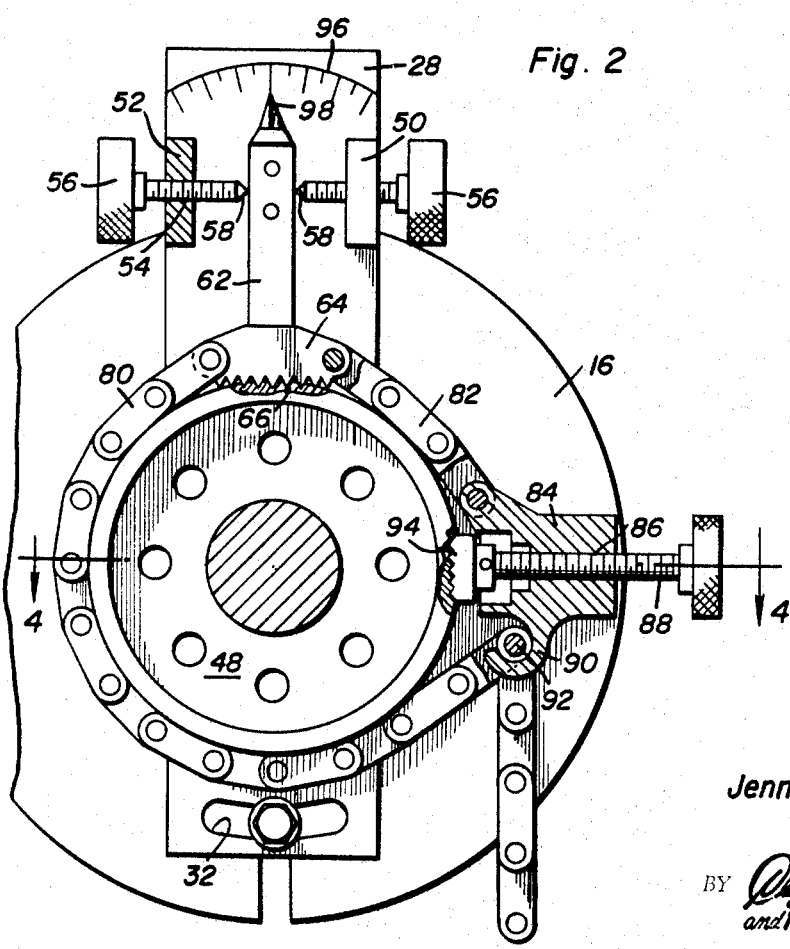
Jennings Turner
INVENTOR.

July 16, 1968  J. TURNER  3,392,612
UNIVERSAL DRIVING AND CLAMPING MEANS
Filed Feb. 7, 1966  3 Sheets-Sheet 2

Jennings Turner
INVENTOR.

July 16, 1968  J. TURNER  3,392,612

UNIVERSAL DRIVING AND CLAMPING MEANS

Filed Feb. 7, 1966  3 Sheets-Sheet 3

Jennings Turner
INVENTOR.

BY *Clarence A. O'Brien*
and *Harvey B. Jacobson*
Attorneys

United States Patent Office 3,392,612
Patented July 16, 1968

3,392,612
UNIVERSAL DRIVING AND CLAMPING MEANS
Jennings Turner, P.O. Box 255, Mayfield, Ky. 42066
Filed Feb. 7, 1966, Ser. No. 525,721
14 Claims. (Cl. 82—40)

ABSTRACT OF THE DISCLOSURE

A supporting structure for supporting a workpiece in generally centered position from the headstock of a lathe for rotation therewith and including means for swingably supporting the workpiece for oscillation about an axis spaced transversely of the axis of rotation of the lathe. The support structure also includes means for attachment to the lathe head stock for shifting of the support structure transversely of the axis of rotation of the head stock.

---

This invention relates to a novel and useful universal driving and clamping device and more specifically to an apparatus comprising a mounting member adapted for securement to the head stock of a lathe and including clamping means supported from the mounting member and adapted to clampingly engage a portion of the workpiece to be turned by the head stock. Further, the clamping means is supported from the mounting member in a manner such that the clamping means and the workpiece supported thereby may be angularly adjusted relative to an axis generally paralleling the axis of rotation of the associated head stock.

The main object of this invention is to provide a universal driving and clamping device for mounting on a lathe head stock and adapted to clampingly support a workpiece to be turned by the lathe in a manner such that the workpiece to be turned may be shifted laterally of the axis of rotation of the corresponding head stock.

Another object of this invention is to provide a driving and clamping device adapted to be supported from the head stock of a lathe and which includes clamping means adapted to clampingly engage the workpiece to be turned by the lathe and which is shiftable relative to the mounting members by which the clamping device is secured to the head stock along a path generally paralleling the axis of rotation of the head stock.

Yet another object of this invention is to provide an apparatus in accordance with the preceding objects and including a clamping device of the aforementioned character which is also supported for rotation about an axis disposed at generally right angles relative to the associated head stock.

A still further object of this invention is to provide a driving and clamping device including clamping means of the aforementioned type supported from the mounting member for annular displacement about an axis generally paralleling the axis of rotation of the associated head stock.

A further object of this invention, in accordance with the preceding object, is to provide clamping means for the apparatus of the instant invention which will be readily adjustable so as to be adapted to clampingly engage various size workpieces to be turned by the associated lathe.

A final object of this invention to be specifically enumerated herein is to provide a universal driving and clamping device which will conform to conventional forms of manufacture, be of simple construction and easy to use so as to provide a device that will economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary top plan view of a conventional form of lathe shown with the universal driving and clamping device of the instant invention mounted on the head stock of the lathe and clampingly engaged with the workpiece extending between the head stock and the tail stock of the lathe;

FIGURE 2 is an enlarged fragmentary transverse vertical sectional view taken substantially upon the plane indicated by the section line 2—2 of FIGURE 1;

Figure 3:
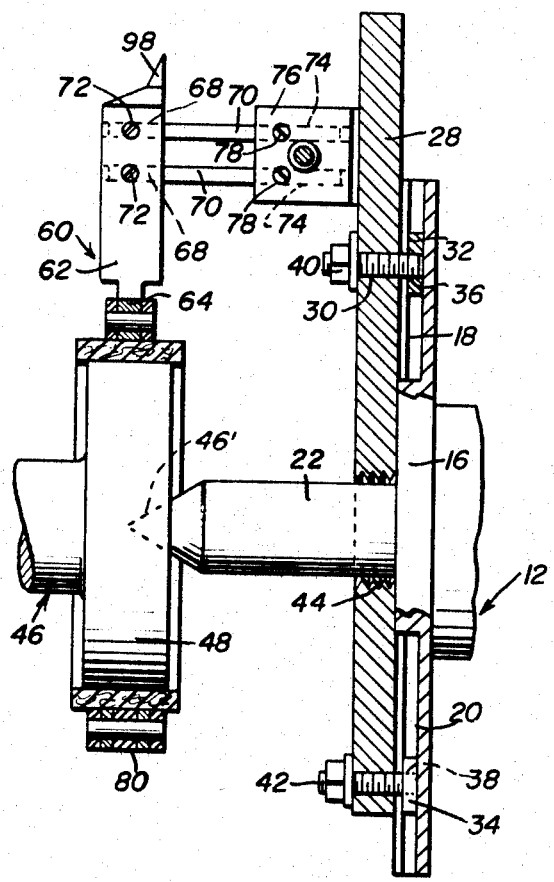
FIGURE 3 is an enlarged fragmentary vertical sectional view taken substantially upon the plane indicated by the section line 3—3 of FIGURE 1.

Referring now more specifically to the drawings the numeral 10 generally designates a lathe including a driven head stock generally referred to by the reference numeral 12 and a tail stock generally referred to by the reference numeral 14. The head stock 12 includes a face plate 16 provided with radially extending way grooves 18 and 20 and a center 22 is supported from the face plate 16 and projects outwardly therefrom toward the tail stock 14. In addition, the tail stock 14 includes a center 24 which is axially aligned with and projects outwardly from the tail stock 14 toward the head stock 12.

Of course, the foregoing specific description of the lathe 10 is to be considered as conventional construction not to be considered as a part of the instant invention except for the necessary coaction which exists between the lathe 10 and the universal driving and clamping device of the instant invention which is generally referred to by the reference numeral 26.

With attention now invited more specifically to FIGURES 1-4 of the drawings it may be seen that the driving and clamping device 26 includes a mounting plate 28 apertured as at 30 and having an arcuate slot 32 formed therein having the aperture 30 as its center of curvature.

A pair of slides 32 and 34 are slidingly disposed in the ways 18 and 20 and are provided with threaded bores 36 and 38 in which fasteners 40 and 42, respectively, are threadedly engaged. The fasteners 40 and 42 of course project outwardly through the apertures 39 and the slot 32 and thereby mount the mounting plate 28 on the face plate 16 of the head stock 12.

The central portion of the mounting plate 28 is provided with an internally threaded bore 44 through which the center 22 supported from the face plate 16 projects, the free ends of the centers 22 and 24 engaging the opposite ends of a crankshaft generally referred to by the reference numeral 46 supported between the centers 22 and 24 with the centers seated in conical recesses 46' (not necessarily perfectly centered) formed in the opposite ends of the crankshaft 46.

The crankshaft 46 includes a conventional mounting flange 48 upon which a flywheel may be mounted and the end of the mounting plate 28 remote from the slot 32 is provided with a pair of outwardly projecting mounting ears 50 and 52 each having a threaded bore 54 formed therethrough in which a support and adjusting screw 56 is threadedly engaged. The bores 54 are aligned and the adjacent ends of the adjusting screws 56 include conical tips 58.

A clamp or support assembly generally referred to by the reference numeral 60 is provided and includes an abutment arm 62 including a crosshead 64 on one end having a toothed surface 66 adapted to frictionally engage the mounting flange 48. The other end of the abutment arm 62 is provided with a pair of bores 68 which extend transversely of the arm 62 and the crosshead 64 and which have one pair of corresponding ends of a pair of mounting pins 70 adjustably secured therein by means of setscrews 72. The other pair of corresponding ends of the mounting pins 70 are adjustably secured in a pair of bores 74 formed in a mounting block 76 and aligned with the bores 68. A pair of setscrews 78 corresponding to the setscrews 72 are provided to retain the mounting pins 70 in adjusted longitudinally shifted position within the bores 74 and the conical tips 58 of the support and adjusting screws 56 abuttingly engage opposite side portions of the mounting block 76 and thereby support the block 76 therebetween.

One end of the crosshead 64 has a first end of a length of chain 80 pivotally secured thereto and the other end of the crosshead 64 has one end portion of a second length of chain 82 pivotally secured thereto. The free end of the chain 82 has a body 84 pivotally secured thereto and the body 84 has a threaded bore 86 formed therethrough in which an abutment screw shaft 88 is threadedly engaged. In addition, the body 84 includes a hook 90 with which selected cross pins 92 of the chain 90 may be engaged.

With the chains 80 and 82 encircling the flange 48 as illustrated in FIGURE 2 of the drawings and one of the cross pins 92 engaged with the hook 90, the screw shaft 88 may be turned so as to be advanced inwardly through the bore 86 thereby forcing the abutment head 94 rotatably mounted on the inner end of the screw shaft 88 to abuttingly engage the flange 48. Continued rotation of the screw shaft 88 inwardly will, of course, cause the body 84 to move generally radially outwardly of the flange 48 and therefore the chains 80 and 82 to be tightened. In this manner the end of the crankshaft 46 having the flange 48 thereon is supported from the center 22 and the clamp assembly 60 which is in turn supported from the mounting plate 28 secured to the face plate 16.

The mounting plate 28 is provided with indicia 96 with which a pointer 98 carried by the mounting block 76 is registrable and the screw shafts 56 may be simultaneously rotated in the same direction so as to cause the mounting block 76 and the arm 62 supported therefrom to be swung about the center 22 thereby angularly adjusting the crankshaft 46 relative to the centers 22 and 24 from which the crankshaft 26 is supported.

With attention now invited more specifically to FIGURES 5-8 of the drawings there will be seen a modified form of universal driving and clamping device which is substantially identical to the device 26 and generally designated by the reference numeral 100. The device 100 includes an abutment arm generally referred to by the reference numeral 102 but which is formed in two sections, a first section 104 corresponding to the upper end portion of the arm 62 and a second section 106 corresponding to the lower end of the arm 62 and which includes a crosshead 108 corresponding to the crosshead 64. However, the adjacent ends of the sections 104 and 106 are provided with aligned bores 110 and 112 in which opposite ends of a pivot pin 144 are rotatably secured by means of setscrews 116 and 118, respectively.

A pair of chains 80' and 82' are pivotally secured to opposite ends of the crosshead 108 and a body 120 similar to the body 84 is pivotally secured to the end of the chain 82' remote from the crosshead 108. The body 120 includes a toothed surface 122 for engagement with the flange 48 and pivotally supports therefrom a journal block 124 through which a screw hook 126 is secured by means of a threaded abutment member. The hooked end 130 of the hook 126 is, of course, engaged with one of the crosspins 92' of the chain 80' and therefore it may be seen that adjustment of the abutment member 128 on the screw hook 126 will cause the chains 80' and 82' to be tightened about the flange 48. Further, the free end of the chain 80' has a magnet 132 removably hooked thereto and magnetically engaged with the portion of the chain 80' tensioned about the flange 48. Of course, the hooked magnet 132 may be utilized on the free end of the chain 80 in the same manner.

The universal driving and clamping devices 26 and 100 of the instant invention may be readily adjusted so as to vary the positioning of the corresponding clamp assemblies relative to the associated mounting plates or members. The arms 62 and 102 may be adjusted toward and away from the corresponding mounting plates along a path generally paralleling the axis of rotation of the head stock 12, the mounting plate may be angularly adjusted relative to the base plate 16 such as by loosening the fasteners 40 and 42 and swinging the lower end of the mounting plate 28 relative to the fastener 42 before re-tightening the fasteners 40 and 42 and the clamp assemblies may be angularly displaced about the axis of rotation of the head stock 12 such as by adjusting the adjustment screws 56. Still further, inasmuch as the sections 104 and 106 of the arm 102 are supported for relative rotation, the clamp assembly defined by the crosshead 108, the chains 80' and 82 and the body 120 may be adjustably rotated about an axis disposed at substantially right angles to the axis of rotation of the head stock 12.

Figure 9:
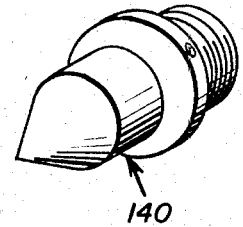
FIGURE 9 is a perspective view of a removable center which may be secured to the universal driving and clamping device of the instant invention and utilized in lieu of a center supported from the head stock of the lathe.
Figure 4:
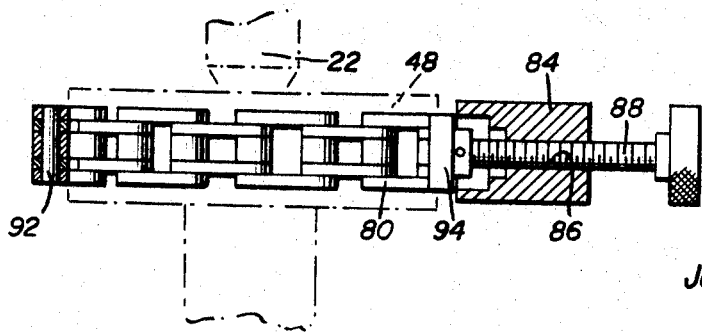
FIGURE 4 is a fragmentary horizontal sectional view taken substantially upon the plane indicated by the section line 4—4 of FIGURE 2.
Figure 5:
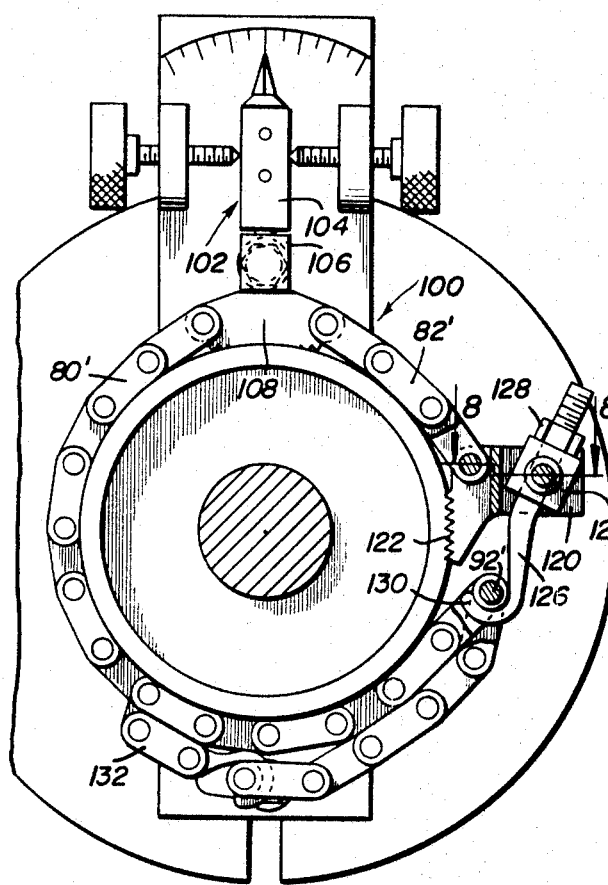
FIGURE 5 is an enlarged fragmentary vertical sectional view similar to that of FIGURE 2 but illustrating a modified form of clamp.
Figure 6:
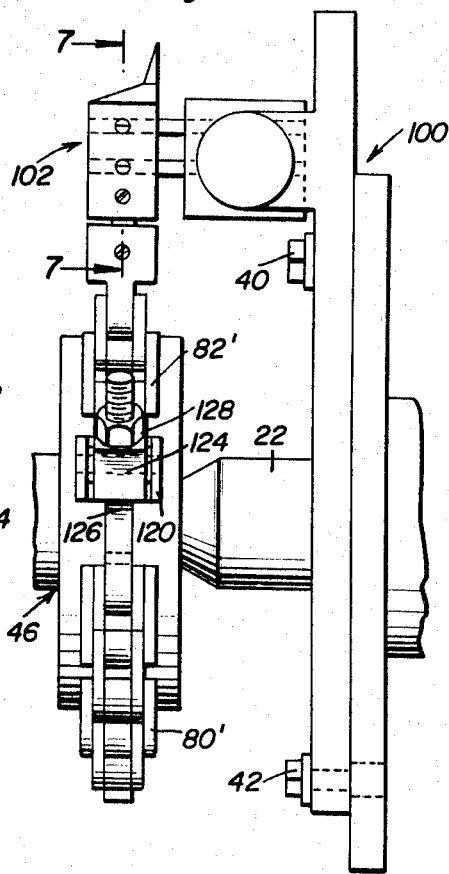
FIGURE 6 is a side elevational view of the embodiment illustrated in FIGURE 5 as seen from the right side thereof.
Figure 7:
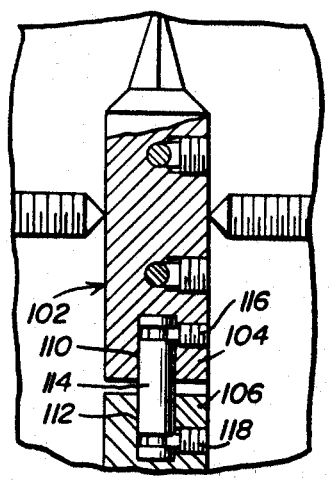
FIGURE 7 is a fragmentary enlarged vertical sectional view taken substantially upon the plane indicated by the section line 7—7 of FIGURE 6.
Figure 8:
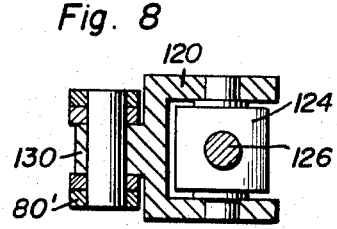
FIGURE 8 is an enlarged fragmentary horizontal sectional view taken substantially upon the plane indicated by the section line 8—8 of FIGURE 5.

In addition, the bore 44 may be greatly increased in diameter and the entire mounting plate 28 may therefore be shifted radially of the axis of rotation of the head stock 12. In addition, should the head stock 12 not include the center 22 supported from the base plate 16, the removable center illustrated in FIGURE 9 of the drawings and generally referred to by the reference numeral 140 may be threadedly engaged in the bore 44 and utilized in lieu of the center 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a journalled head stock, a clamping device including a mounting member defining a center with which one end of a shaft is to be at least approximately centered, means securing said mounting member to said head stock for rotation therewith and for angular adjustment of said mounting member relative to said head stock about an axis generally paralleling the axis of rotation of said head stock but spaced transversely of the axis of rotation of said head stock as well as said center, said device also including clamp means supported from said mounting member and adapted to clampingly engage a portion of said workpiece adjacent said head stock and to support said portion in approximately centered position relative to said center.

2. The combination of claim 1 wherein said means securing said mounting member to said head stock includes means operable to adjustably position said mounting member laterally of the axis of rotation of said head stock.

3. The combination of claim 1 wherein said means supporting said clamp means from said mounting member also includes means operative to adjustably position said clamp means laterally of said axis of angular adjustment.

4. The combination of claim 1 wherein said mounting member includes means defining a void area through which a center projecting outwardly of said head stock is adapted to project for engagement with the adjacent face of said workpiece.

5. The combination of claim 1 wherein said means supporting said clamp means from said mounting member includes means preventing pivotal movement of said clamp means relative to said mounting member about an axis disposed normal to said axis of angular adjustment.

6. The combination of claim 1 wherein said clamp means is supported from said mounting member by means operative to allow angular adjustment of said clamp means about an axis generally paralleling said axis of angular adjustment of said mounting member relative to said head stock and passing through said center.

7. A universal driving and clamping device comprising a mounting member adapted to properly angularly adjust an elongated workpiece supported from and to be rotated by the head stock of said lathe, said clamping device defining an axis of angular adjustment and including mounting means adapted to secure said mounting member to said head stock for rotation therewith, with said axis of angular adjustment generally paralleling the axis of rotation of said head stock, said device also including clamping means adapted to clampingly engage a portion of said workpiece adjacent said head stock, said device further including means supporting said clamping means from said mounting member and operative to angularly adjust said clamp means about an axis generally paralleling said axis of angular adjustment relative to said mounting member, said means supporting said clamping means from said mounting member including means operative to adjustably position said clamping means along said axis of angular adjustment.

8. A universal driving and clamping device comprising a mounting member adapted to properly angularly adjust an elongated workpiece supported from and to be rotated by the head stock of said lathe, said clamping device defining an axis of angular adjustment and including mounting means adapted to secure said mounting member to said head stock for rotation therewith, with said axis of angular adjustment generally paralleling the axis of rotation of said head stock, said device also including clamping means adapted to clampingly engage a portion of said workpiece adjacent said head stock, said device further including means supporting said clamping means from said mounting member and operative to angularly adjust said clamp means about an axis generally paralleling said axis of angular adjustment relative to said mounting member, said means supporting said clamping means from said mounting member including means supporting said clamping member for rotation about an axis disposed at generally right angles relative to said axis of angular adjustment.

9. The combination of claim 8 wherein said means supporting said clamping means from said mounting member includes means operative to adjustably position said clamping means along said axis of angular adjustment.

10. A universal driving and clamping device comprising a mounting member adapted to properly angularly adjust an elongated workpiece supported from and to be rotated by the head stock of said lathe, said clamping device defining an axis of angular adjustment and including mounting means adapted to secure said mounting member to said head stock for rotation therewith, with said axis of angular adjustment generally paralleling the axis of rotation of said head stock, said device also including clamping means adapted to clampingly engage a portion of said workpiece adjacent said head stock, said device further including means supporting said clamping means form said mounting member and operative to angularly adjust said clamp means about an axis generally paralleling said axis of angular adjustment relative to said mounting member, said mounting member including a center spindle projecting outwardly therefrom and generally paralleling said axis of angular adjustment.

11. The combination of claim 10 wherein said center spindle is removably supported in a bore formed through said mounting member generally paralleling said axis of angular adjustment and said bore, when said spindle is removed, is adapted to be registered with and receive therethrough a center spindle supported from said head stock.

12. A universal driving and clamping device comprising a mounting member adapted to properly angularly adjust an elongated workpiece supported from and to be rotated by the head stock of said lathe, said clamping device defining an axis of angular adjustment and including mounting means adapted to secure said mounting member to said head stock for rotation therewith, with said axis of angular adjustment generally paralleling the axis of rotation of said head stock, said device also including clamping means adapted to clampingly engage a portion of said workpiece adjacent said head stock, said device further including means supporting said clamping means from said mounting member and operative to angularly adjust said clamp means about an axis generally paralleling said axis of angular adjustment relative to said mounting member, said clamp means including elongated chain means and means operative to adjustably tighten said chain means about said workpiece.

13. The combination of claim 12 wherein said supporting means for said clamping means includes an elongated arm member having one end thereof disposed in and comprising a rigid elongated section of said chain means.

14. The combination of claim 13 wherein said arm means projects laterally outwardly of said elongated section and the free end thereof is supported from said mounting member for swinging movement about said axis of angular adjustment relative to said mounting member.

References Cited
UNITED STATES PATENTS 2,447,334   8/1948   Healy _____ 82—40.1 XR
3,183,012   5/1965   Watson _____ 279—6

LEONIDAS VLACHOS, *Primary Examiner.*